C. A. PARSONS, S. S. COOK AND L. M. DOUGLAS.
TURBINE BLADE ATTACHMENT.
APPLICATION FILED JUNE 16, 1920.
1,387,304.
Patented Aug. 9, 1921.
3 SHEETS—SHEET 1.
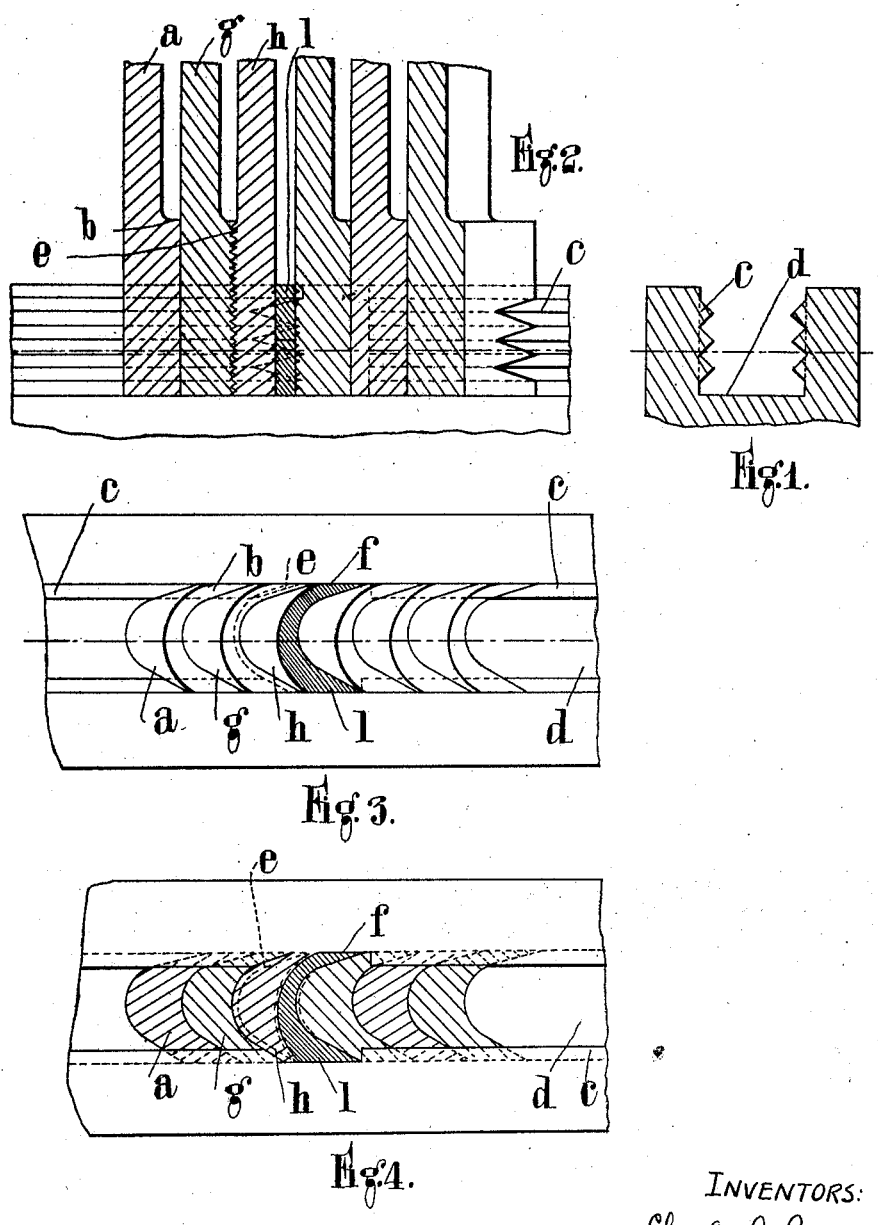

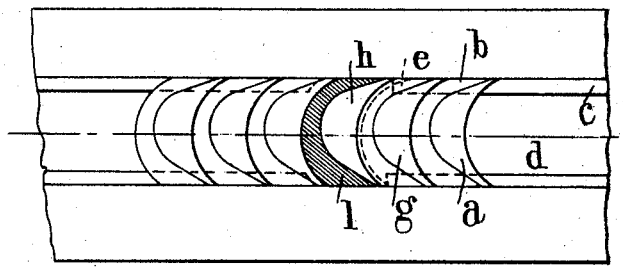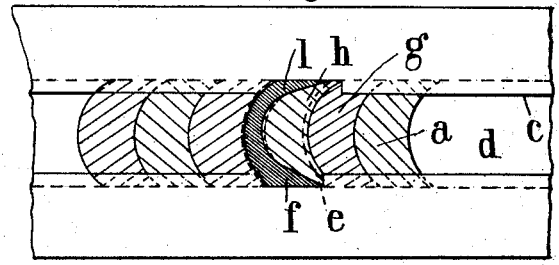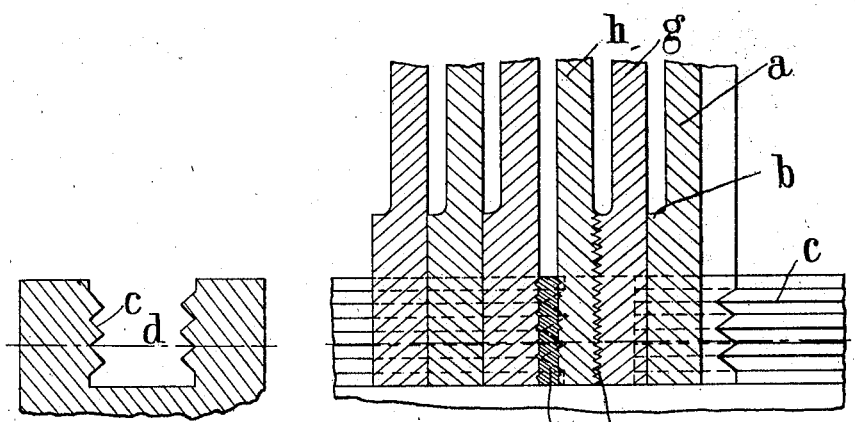

C. A. PARSONS, S. S. COOK AND L. M. DOUGLAS.
TURBINE BLADE ATTACHMENT.
APPLICATION FILED JUNE 16, 1920.
1,387,304.
Patented Aug. 9, 1921.
3 SHEETS—SHEET 3.
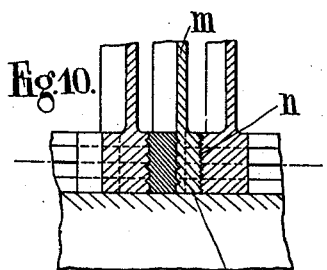
Fig.10.
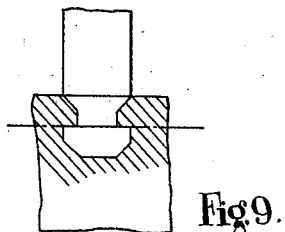
Fig.9.
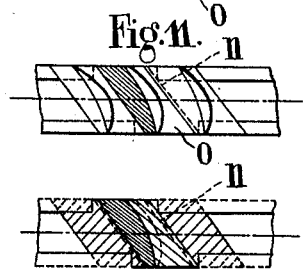
Fig.11.
Fig.12.
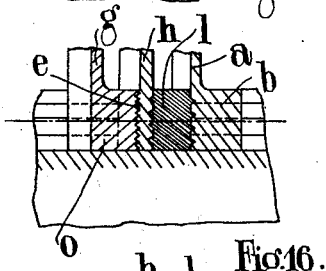
Fig.16.
Fig.17.
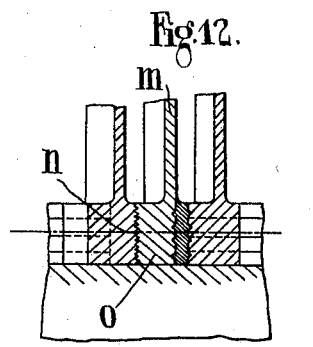
Fig.13.
Fig.18.
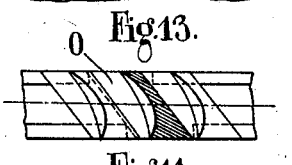
Fig.14.
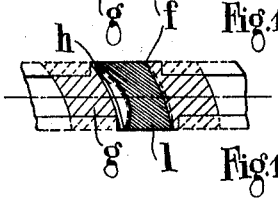
Fig.15.
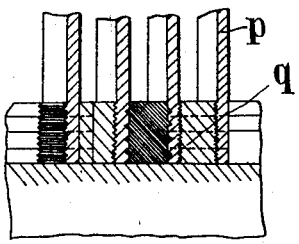
Fig.19.
Fig.20.
INVENTORS:
Charles A. Parsons,
Stanley S. Cook,
Louis M. Douglas.
BY Spear, Middleton, Donaldson & Hall
Atty s.

UNITED STATES PATENT OFFICE.

CHARLES ALGERNON PARSONS, STANLEY SMITH COOK, AND LOUIS MORTIMER DOUGLAS, OF NEWCASTLE-UPON-TYNE, ENGLAND; SAID COOK AND SAID DOUGLAS ASSIGNORS TO SAID PARSONS.

TURBINE-BLADE ATTACHMENT.

1,387,304.  Specification of Letters Patent.  Patented Aug. 9, 1921.

Application filed June 16, 1920. Serial No. 389,428.

*To all whom it may concern:*

Be it known that we, CHARLES ALGERNON PARSONS, STANLEY SMITH COOK, and LOUIS MORTIMER DOUGLAS, all subjects of the King of Great Britain and Ireland, and all residing at Heaton Works, Newcastle-upon-Tyne, in the county of Northumberland, England, have invented a certain new and useful Improved Turbine-Blade Attachment, of which the following is a specification.

The present invention relates to turbine blade attachments of the type in which the blades and spacing sections are secured in a groove in the rotor having lateral projections running circumferentially around the sides.

The object of the invention is to provide an improved method of attachment particularly relating to the insertion of the last blade or packing piece, and the method is especially applicable to constructions in which the blades are integral with or attached to the packing or spacing sections.

In the United States patent specification No. 1,328,640 a method of inserting the last inserted section is described in which this section is inserted into a recess where the circumferential projection and part of the wall of the groove are cut away, the blade or section being inserted to the full depth of the groove and then passed sidewise into position.

With some blades, however, particularly those of the impulse type, the cross section of the blade is such that a blade or spacing section, or a combined blade and spacing section, will not pass sidewise into position between adjacent sections, so that to carry out the proposal of the above patent specification with such blades the employment of two recesses is necessitated one at either side of the groove.

Further, in some forms of rotor it is inconvenient to provide recesses at the sides of the groove, for example, in the case of a disk carrying a single row of impulse blades the provision of a recess or recesses at the sides of the groove would necessitate, in order to obtain the necessary strength, a very inconvenient increase in the cross-section of the rim in which the blades are mounted.

The object of the present invention is to provide a construction in which the blades and spacing sections in a groove are all positively retained against radial extracting forces without any increase in the maximum width of the groove at any point, that is to say, without the provision of recesses or local cutting away of the walls of the groove.

In some cases the lateral projections on the sides of the groove at the port of the circumference have been cut away and the blades inserted at this part of the groove and passed circumferentially into place, the space in which the blades are inserted being subsequently filled up by a large calking section, so that a gap is left in the blading.

The present invention consists in providing means whereby the last inserted blade is, by means of projections, locked to the blade or packing piece adjacent to it, the last inserted packing piece being separate from the blade and calked into position, preferably engaging with transverse serrations or projections on the adjacent blades.

The invention further consists in the improved turbine blade attachment hereinafter described.

Referring to the accompanying drawings:—

Figure 1 is a section through a groove provided with circumferential projections for the purpose of retaining the blades and sections.

Fig. 2 is a sectional elevation through the last inserted blade and several adjacent blades.

Fig. 3 is a plan, and

Fig. 4 is a sectional plan of the same.

Figs. 5, 6, 7 and 8 are corresponding views of another example of the invention.

Figs. 9, 10, 11 and 12 show another example.

Figs. 13, 14 and 15 show a form similar to that shown in Figs. 9–12, the calking piece being inserted on the opposite side.

Figs. 16, 17 and 18 show another example.

Figs. 19 and 20 show a form in which separate blades and packing sections are used.

In the form of the invention shown in Figs. 1 to 4, the blades *a* and packing sections *b* are combined, the packing sections being formed on the concave sides of the blades. The projections *c* at the sides of the groove *d* in the rotor in which the blades are inserted are cut away at one point *f*, (see Fig. 3) just sufficiently to allow a single combined blade and section to be inserted radially. The blades with their integral sections are passed through this gap to the bottom of the groove and are then moved circumferentially to their proper position, care being taken that the first inserted and last inserted combined blades and sections are properly disposed circumferentially in relation to the gap.

In this form of this invention the packing section portion of the last inserted integral blade $g$ and section is provided with deep serrations $e$ on the concave face which register with similar serrations on the lower part of the convex face of the last inserted blade. This last inserted blade $h$, which is without a packing section, is radially inserted into the gap and moved until its serrations register with the serrations on the last inserted combined blade $g$. Calking sections $l$ are then introduced in the position which would be occupied by the packing section of this last blade.

It will be seen that with this construction, so far as radial extracting forces are concerned, each of the blades is attached positively to the rotor, being held positively by the projections on the sides of the groove. The last inserted blade is positively held by its engagement with the serrations on the blade next to it, while the only portion attached to the rotor which is not positively held is the last inserted packing section, which is calked in. The radial extracting forces acting on this piece or pieces are so small as to be practically negligible, its principal function being merely to keep the serrated face of the last inserted blade in register with the serrated face of the packing piece of the integral packing piece and blade with which the last inserted blade is in contact. The calking of this last inserted packing section incidentally fulfils the useful function of tightening up circumferentially the whole ring of blades and thus prevents any chattering which would result from slackness in this direction. Some or all the surfaces which are in contact with the calking pieces are preferably provided with slight indentations or serrations into which metal is caused to flow by calking.

The form of the invention shown at Figs. 5, 6, 7 and 8 only differs from that above described in that the packing sections are placed on the convex sides of the blades.

In the form shown in Figs. 9, 10, 11 and 12 the blades and sections are made in the manner described in the United States patent specification No. 1,344,311. The last inserted blade $m$ has an extended base $o$ on the convex side of the blade and this base is formed to engage with the serrations $n$ or projections on the adjacent combined blade and section.

It will be seen that the calking piece may be inserted at the opposite side of the last inserted blade if desired, as shown at Figs. 13, 14 and 15. Further, reaction blades may be attached in a similar manner to that described for impulse blades.

Figs. 16, 17 and 18 show an example similar to that shown in Figs. 5, 6, 7 and 8 but in which reaction blades are employed.

According to another example, shown in Figs. 19 and 20 separate blades $p$ and packing sections $q$ may be employed in which each blade is positively attached by registering serrations or projections to an adjacent packing section.

In the examples above described the last inserted integral section has by its attachment to the rotor to resist the radial extraction forces both of itself and of the last inserted blade which has no packing section integral with it, the forces on the latter being transmitted to the integral section by means of transverse serrations; and in the case in which the packing sections and blades are not integral, the last inserted packing section has to resist the radial extraction forces of the two blades adjoining it, so that in all cases the last inserted packing section has to resist the extraction forces of two blades. There is no difficulty, however, in making the attachment of this packing piece to the rotor of amply sufficient strength to resist the maximum extraction forces which two blades are capable of sustaining. Further, for additional security several of the combined blades and sections adjacent to the last inserted blade may be attached to each other by transverse serrations similar to those by which the last inserted blade or packing section as above described is positively held.

It will be seen that any type of lateral projection on the groove side or sides can be employed registering with a corresponding depression or depressions on the member which it holds so long as the latter can be passed circumferentially around the groove.

Further, the invention is applicable both to cases in which the blades are inserted at the point where the circumferential projections are cut away and then passed circumferentially into position; and to cases in which the form of the blades allows them, while there is still sufficient space unoccupied by blades, to be inserted at any part of the groove and twisted into position.

It will also be seen that as above described blades which have a radial disposition in the rotor are employed. The invention is, however, equally applicable to blades fitted into the face of a disk or to blades fitted on a conical rotor.

Having now particularly described and ascertained the nature of our said invention and in what manner the same is to be performed, we declare that what we claim is:—

1. In a turbine, the combination of a blade carrier having a groove on the sides of which projections are provided which are cut away at one point, members including blades and packing pieces adapted to be inserted through the space left by the cut-away part and interlocking with the said projections and including also a separate packing piece calked into position, a blade-carrying member adjacent said packing piece interlocking with a portion of the adjoining member located on the side of said blade-carrying member remote from said packing piece, as set forth.

2. In a turbine, the combination of a blade carrier having a groove on the sides of which projections are provided which are cut away at one point, members including blades and packing pieces adapted to be inserted through the space left by the cut-away part and interlocking with the said projections and including also a separate packing piece calked into position and interlocking with adjacent members, a blade-carrying member adjacent said packing piece interlocking with a portion of the adjoining member located on the side of said blade-carrying member remote from said packing piece, as set forth.

In testimony whereof we have signed our names to this specification.

CHARLES ALGERNON PARSONS.
STANLEY SMITH COOK.
LOUIS MORTIMER DOUGLAS.